US012559199B2

(12) United States Patent
Brown

(10) Patent No.: US 12,559,199 B2
(45) Date of Patent: Feb. 24, 2026

(54) DAMPER FOR A BICYCLE COMPONENT

(71) Applicant: SRAM, LLC, Chicago, IL (US)

(72) Inventor: Joshua Brown, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 18/631,734

(22) Filed: Apr. 10, 2024

(65) Prior Publication Data

US 2024/0253736 A1 Aug. 1, 2024

Related U.S. Application Data

(63) Continuation of application No. 17/227,770, filed on Apr. 12, 2021, now Pat. No. 11,987,324.

(51) Int. Cl.
| | |
|---|---|
| *B62M 9/126* | (2010.01) |
| *B62M 9/124* | (2010.01) |
| *B62M 9/1242* | (2010.01) |
| *B62M 9/16* | (2006.01) |

(52) U.S. Cl.
CPC .......... *B62M 9/126* (2013.01); *B62M 9/1242* (2013.01); *B62M 9/16* (2013.01); *B62M 2009/12406* (2013.01)

(58) Field of Classification Search
CPC ... B62M 9/1248; B62M 9/1244; B62M 9/121
USPC .................................................... 474/80, 82
See application file for complete search history.

(56) References Cited

U.S. PATENT DOCUMENTS

| | | | | |
|---|---|---|---|---|
| 6,135,904 | A * | 10/2000 | Guthrie .................. | B62M 9/122 |
| | | | | 474/82 |
| 6,264,578 | B1 * | 7/2001 | Ayukawa .............. | F16H 7/1218 |
| | | | | 474/135 |
| 9,187,149 | B2 * | 11/2015 | Yamaguchi .......... | B62M 9/1244 |
| 9,290,235 | B2 * | 3/2016 | Yamaguchi ............ | B62M 9/124 |
| 9,463,846 | B1 * | 10/2016 | Chang .................. | B62M 9/1248 |
| 9,475,547 | B2 * | 10/2016 | Jordan ................. | B62M 9/1248 |
| 9,751,590 | B2 * | 9/2017 | Shipman .............. | B62M 9/1248 |
| 9,845,134 | B2 * | 12/2017 | Takachi ................. | B62M 9/121 |
| 10,189,542 | B2 * | 1/2019 | Wu ...................... | B62M 9/1242 |

(Continued)

FOREIGN PATENT DOCUMENTS

| | | |
|---|---|---|
| CN | 202320705 | 7/2012 |
| CN | 205381358 | 7/2016 |

(Continued)

*Primary Examiner* — Henry Y Liu

(57) ABSTRACT

A rear derailleur includes a base member mountable to a bicycle frame, a movable member movably coupled to the base member, and a pivot member rotatably coupled to the movable member. The rear derailleur also includes a chain guide assembly rotatably connected to the movable member via the pivot member. The rear derailleur includes a damper device disposed within the movable member. The damper device is operable to apply a damping force to the chain guide assembly when the chain guide assembly rotates. The damper device includes a friction member having a friction surface. A first portion of the friction surface is in frictional engagement with the pivot member, and a second portion of the friction surface is in frictional engagement with the movable member. The friction device is disposed within the movable member at a distance relative to the biasing device in an axial direction along the pivot member.

15 Claims, 6 Drawing Sheets

(56) References Cited

U.S. PATENT DOCUMENTS

| | | | | |
|---|---|---|---|---|
| 10,315,728 B2 * | 6/2019 | Takachi | ............... | B62M 9/1248 |
| 10,351,208 B2 * | 7/2019 | Yamaguchi | .......... | B62M 9/1244 |
| 10,435,110 B2 * | 10/2019 | Calendrille | .......... | B62M 9/1244 |
| 10,435,111 B2 * | 10/2019 | Shipman | ................ | B62M 9/126 |
| 10,577,053 B2 * | 3/2020 | Brown | ................... | B62M 9/126 |
| 10,604,212 B2 * | 3/2020 | Takachi | ............... | B62M 9/1248 |
| 10,882,587 B2 * | 1/2021 | Chang | ................... | B62K 19/18 |
| 11,098,787 B2 * | 8/2021 | Ziegler | .............. | F16F 15/1292 |
| 11,110,993 B2 * | 9/2021 | Rodgers | .............. | B62M 9/1248 |
| 11,148,754 B2 * | 10/2021 | Qin | ...................... | B62M 9/1248 |
| 11,167,819 B2 * | 11/2021 | Ma | ......................... | B62M 9/126 |
| 11,199,240 B2 * | 12/2021 | Brown | ...................... | F16F 9/34 |
| 11,649,875 B2 * | 5/2023 | Brown | ...................... | F16F 9/10 |
| | | | | 267/64.11 |
| 11,667,350 B2 * | 6/2023 | Chang | ................. | B62M 9/1244 |
| | | | | 474/82 |
| 2008/0026890 A1 * | 1/2008 | Oseto | ................... | B62M 9/1242 |
| | | | | 474/82 |
| 2008/0026891 A1 * | 1/2008 | Oseto | ................... | B62M 9/1242 |
| | | | | 474/82 |
| 2012/0083372 A1 * | 4/2012 | Yamaguchi | ........... | B62M 9/126 |
| | | | | 474/80 |
| 2012/0258827 A1 * | 10/2012 | Ishikawa | .............. | B62M 9/1248 |
| | | | | 474/80 |
| 2013/0203532 A1 * | 8/2013 | Jordan | ................. | B62M 9/1248 |
| | | | | 474/82 |
| 2013/0288834 A1 * | 10/2013 | Yamaguchi | ........... | B62M 9/126 |
| | | | | 474/80 |
| 2015/0111675 A1 * | 4/2015 | Shipman | ................ | B62M 9/124 |
| | | | | 474/82 |
| 2016/0046352 A1 * | 2/2016 | Shipman | ................ | B62M 9/128 |
| | | | | 29/428 |
| 2016/0176478 A1 * | 6/2016 | Chang | ................... | B62M 9/126 |
| | | | | 474/69 |
| 2017/0283004 A1 * | 10/2017 | Calendrille | .......... | B62M 9/1244 |
| 2018/0370598 A1 * | 12/2018 | Chang | ................... | B62M 9/128 |
| 2019/0100280 A1 * | 4/2019 | Brown | ...................... | B62M 1/36 |

FOREIGN PATENT DOCUMENTS

| | | |
|---|---|---|
| CN | 110116780 | 8/2019 |
| DE | 102018004483 | 12/2018 |
| EP | 2985217 | 2/2016 |
| EP | 3421346 | 1/2019 |
| TW | 201904812 | 2/2019 |
| TW | I682875 | 1/2020 |
| TW | I690452 | 4/2020 |
| TW | I693179 | 5/2020 |
| WO | 2017/173151 | 10/2017 |

* cited by examiner

DAMPER FOR A BICYCLE COMPONENT

This application claims the benefit of U.S. patent application Ser. No. 17/227,770, filed Apr. 12, 2021, which is hereby incorporated by reference in its entirety.

BACKGROUND

1. Field of the Disclosure

The present disclosure is generally directed to a bicycle chain tensioner, and more particularly, to a damper for a bicycle rear derailleur.

2. Description of Related Art

Bicycle rear derailleurs are well known in the art as a part of a drivetrain of a bicycle. The typical drivetrain also includes a crank assembly that is coupled to one or more sprockets. The crank assembly is operable to drive a chain that is routed or wrapped around one of the sprockets. The chain is also routed to the rear wheel of the bicycle.

Rear derailleurs are provided as a part of the drivetrain to perform two basic functions. The primary function of the rear derailleur is to selectively shift a bicycle chain of the drivetrain among a series of different diameter cogs that are attached to the rear wheel. Shifting of the bicycle chain from one cog to another at the rear wheel is done in order to change the gear ratio of the drivetrain. The rear derailleur may also include a chain tensioner to apply a tension to the chain to take-up slack, as well as to maintain the desired tension, in the chain on the non-drive-side of the drivetrain. A chain tensioner may be included as part of the rear derailleur, or as a separate piece.

The chain tensioner of a rear derailleur accomplishes the tensioning function by employing a chain tensioning mechanism as integrated with a chain guide cage. The chain tensioner typically has one or two rotatable cogs or pulleys, and the chain is routed or wrapped around the pulleys. The chain tensioner is connected to the main body of the rear derailleur in a manner that allows the chain tensioner to pivot relative to the main body. The chain tensioner is also biased to pivot or rotate in a direction that tensions or applies a tensioning force to the chain.

When a bicycle travels over smooth terrain, the standard rear derailleur and chain tensioner include a biasing member to provide forces that are often sufficient to maintain enough tension in the chain so that the chain does not fall off the sprockets or cogs. However, when a bicycle travels over rough terrain, the forces transmitted to the rear derailleur can cause the chain tensioner to undesirably rotate in the chain slackening direction against the biasing force applied to the chain tensioner. This creates a slack condition in the chain. A slack chain can lead to the chain slapping against the frame of the bicycle. A slack chain can also lead to the chain falling off the sprockets or cogs.

A solution to this undesirable condition is to incorporate a damping system into the chain tensioning part of the derailleur. A damping system is designed to resist chain tensioner rotation, particularly in the chain slackening direction. A one-way damping system is configured to resist chain tensioner rotation in the chain slackening direction while still allowing free chain tensioner rotation in the chain tensioning direction. The typical one-way damping systems work by using a frictional element to provide a damping force in the chain slackening direction of chain tensioner rotation, and include a one-way roller clutch to prevent the frictional element from engaging in the chain tensioning direction.

These roller clutch based friction type damping systems are relatively heavy, which runs counter to a common performance goal of reducing bicycle weight. Further, this type of friction damping system may be rather complicated in construction, requiring multiple parts and numerous manufacturing steps. One result of the complicated nature of roller clutch based friction type damping systems is that the parts are relatively expensive, which increases the cost of the rear derailleurs.

SUMMARY

In one example, a bicycle rear derailleur includes a base member mountable to a bicycle frame, a movable member movably coupled to the base member, and a pivot member rotatably coupled to the movable member. The pivot member has an outer annular surface. The bicycle rear derailleur also includes a chain guide assembly rotatably connected to the movable member via the pivot member. The chain guide assembly is non-rotatably coupled to the pivot member. The bicycle rear derailleur includes a biasing device configured to bias the chain guide assembly in a first rotational direction relative to the movable member, and a damper device disposed within the movable member. The damper device is operable to apply a damping force to the chain guide assembly when the chain guide assembly rotates in a second rotational direction relative to the movable member. The second rotational direction is opposite the first rotational direction. The damper device includes a friction device including a friction member. The friction member has a friction surface. A first portion of the friction surface is biased against and in frictional engagement with the outer annular surface of the pivot member, and a second portion of the friction surface is biased against and in frictional engagement with the movable member. The friction device is disposed within the movable member at a distance relative to the biasing device in an axial direction along the pivot member, such that the friction device and the biasing device do not overlap in the axial direction.

In one example, a distance between the friction device and the chain guide assembly in the axial direction is greater than a distance between the biasing device and the chain guide assembly in the axial direction.

In one example, the friction device is radially inner relative to the biasing device.

In one example, the second portion of the friction surface is larger than the first portion of the friction surface.

In one example, the friction member is a torsion spring, and the friction surface is an inner surface of the torsion spring.

In one example, the torsion spring is left hand wound.

In one example, the movable member has a single open side. The movable member includes a cavity that extends from the single open side of the movable member into the movable member. The friction device and at least part of the pivot member are disposed in the cavity.

In one example, the single open side of the movable member is on a same side of the movable member as the chain guide assembly.

In one example, the friction member has a first end and a second end opposite the first end. The first end of the friction member is biased towards the chain guide assembly.

In one example, the second portion of the friction surface is in frictional engagement with one or more inner surfaces of the movable member. The one or more inner surfaces of the movable member at least partially form the cavity. The second portion of the friction surface is in frictional engagement with a surface of the one or more inner surfaces of the movable member at, adjacent to, or at and adjacent to the second end of the friction member, such that the first end of the friction member is biased towards the chain guide assembly.

In one example, the surface of the movable member is angled relative to an axis of rotation of the pivot member such that the friction member is biased towards the chain guide assembly.

In one example, the damper device further includes a dynamic seal disposed within the cavity and around the pivot member. The dynamic seal and the pivot member enclose the friction member within a portion of the cavity.

In one example, a movable member for a bicycle rear derailleur includes a housing having a single open side and a cavity extending from the single open side of the housing, partially through the housing. The movable member also includes a pivot member rotatably supported within the cavity of the housing, and a damper device disposed within the cavity of the housing and around a portion of the pivot member. The damper device is operable to apply a damping force to a chain guide assembly rotatably attached to the movable member via the pivot member as the chain guide assembly rotates in a rotational direction relative to the movable member. The damper device includes a friction device including a friction member having a friction surface. A portion of the friction surface is biased against and in frictional engagement with the pivot member.

In one example, the portion of the friction surface is a first portion of the friction surface, and a second portion of the friction surface is biased against and in frictional engagement with the housing.

In one example, the friction member has a portion that is non-rotatably coupled to the housing. The pivot member has a first end and a second end opposite the first end. The first end of the pivot member is rotatably supported within the cavity of the housing, and the second end of the pivot member is attachable to the chain guide assembly. The friction member is disposed within the cavity of the housing closer to the first end of the pivot member than the second end of the pivot member.

In one example, the cavity is a first cavity. The housing has a second cavity extending from the single open side of the housing, partially through the housing. The second cavity is radially outer relative to the first cavity. The movable member further includes a biasing device configured to bias the chain guide assembly in a first rotational direction relative to the movable member. The rotational direction is a second rotational direction relative to the movable member. The biasing device is disposed in the second cavity of the housing.

In one example, the friction device is positioned within the housing at a distance relative to the biasing device in an axial direction along the pivot member, such that the friction device and the biasing device do not overlap in the axial direction.

In one example, the damper device further includes a dynamic seal disposed within the first cavity and around the pivot member. The housing, the dynamic seal, and the pivot member enclose the friction member within a portion of the first cavity.

In one example, a bicycle rear derailleur includes a base member mountable to a bicycle frame, and a movable member movably coupled to the base member. The movable member is open on a single side. The movable member has a recess extending from the single open side, partially through the movable member. The bicycle rear derailleur also includes a pivot member rotatably coupled to the movable member, and a chain guide assembly rotatably connected to the movable member via the pivot member. The chain guide assembly is non-rotatably coupled to the pivot member. The bicycle rear derailleur includes a biasing device configured to bias the chain guide assembly in a first rotational direction relative to the movable member, and a damper device disposed within the recess of the movable member. The damper device is operable to apply a damping force to the chain guide assembly when the chain guide assembly rotates in a second rotational direction relative to the movable member. The second rotational direction is opposite the first rotational direction. The damper device includes a friction member having a friction surface that is biased against and in frictional engagement with the pivot member.

In one example, the friction surface is a first friction surface, and the friction member has a second friction surface that is biased against and in frictional engagement with the movable member.

In one example, the friction damper as described herein is disposed in a chain tensioner integrated with, or independent of, a rear derailleur.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

Figure 1:
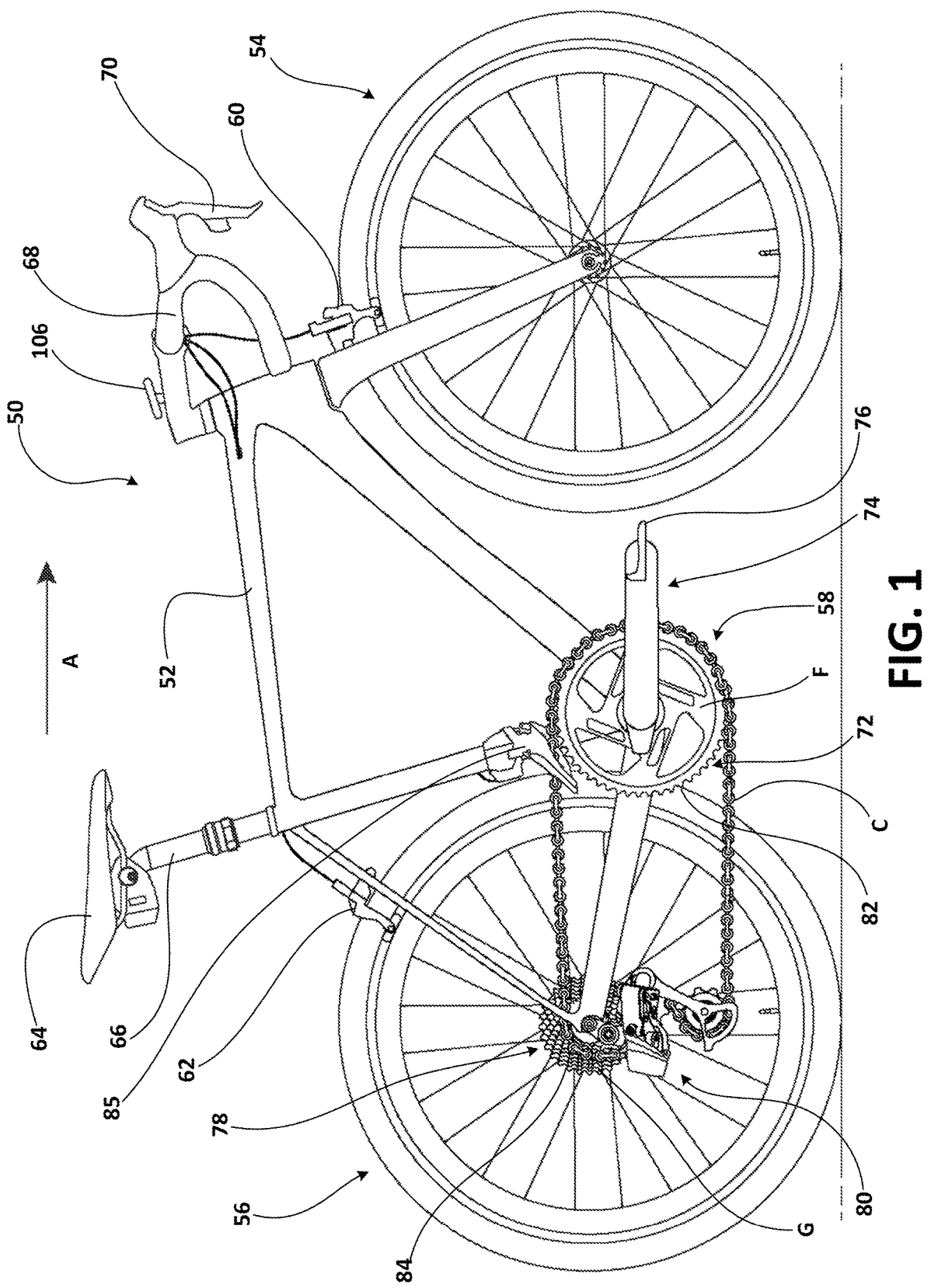
FIG. 1 is a side view schematic of a bicycle that may be constructed to utilize a damper on the rear derailleur.

The present disclosure provides examples of friction dampers, chain tensioners, and bicycle rear derailleurs that solve or improve upon one or more of the above-noted and/or other disadvantages with prior known dampers and derailleurs. The disclosed friction dampers eliminate the need to include roller clutches in the damper. The friction damper restricts derailleur chain tensioner movement in a forward chain tensioner rotational direction and helps control a chain oscillatory amplitude (e.g., a vertical chain amplitude) of a lower half of the chain when the bicycle is subject to ground input (e.g., vertical ground input). A significant advantage of the disclosed friction dampers is that damping forces are higher when the derailleur chain tensioner is rotated in the forward chain tensioner rotational direction compared to the backward chain tensioner rotational direction. The higher damping forces in the forward chain tensioner rotational direction help limit the chain amplitude, while the lower damping forces in the backward chain tensioner rotational direction allow a biasing device, such as a return spring (e.g., a P-spring), to act on the derailleur chain tensioner and maintain chain tension without a large increase or any increase in size of the return spring. Another advantage of the disclosed friction dampers is that the damper is lighter than a traditional roller clutch based friction type damper. Yet another advantage of the disclosed dampers is the ease of manufacturing the dampers and the ease of installation within the rear derailleur.

Examples of friction dampers and bicycle rear derailleurs that employ such friction dampers are disclosed and described herein. The disclosed dampers resist chain tensioner motion in the chain slackening direction of chain tensioner rotation more than in the chain tensioning direction. In other words, the torque generated by the friction damper when the derailleur chain tensioner rotates in the chain slackening direction is greater than the torque generated by the damper when the derailleur chain tensioner rotates in the chain tensioning direction. As a result, damping torque applied by the disclosed dampers is low when a rider is shifting gears, and is high during, for example, an impact or vibration event.

The disclosed friction dampers can reduce the weight of a rear derailleur equipped with such a damper, compared to a rear derailleur equipped with a prior art roller clutch damper. For example, the simple and minimal part design of the disclosed friction dampers weighs less in comparison to, for example, a roller clutch based damped equivalent that includes multiple assembled components. The disclosed friction dampers can also be relatively small and may be cylindrical in shape, which, when mounted on a rear derailleur, may reduce the overall size of the rear derailleur or chain tensioner.

These and other objects, features, and advantages of the disclosed friction dampers will become apparent to those having ordinary skill in the art upon reading this disclosure. Throughout the drawing figures, where like reference numbers are used, the like reference numbers represent the same or substantially similar parts among the various disclosed examples. Also, specific examples are disclosed and described herein that utilize specific combinations of the disclosed aspects, features, and components of the disclosure. However, it is possible that each disclosed aspect, feature, and/or component of the disclosure may in other examples not disclosed or described herein, be used independent of or in different combinations with other of the aspects, features, and components of the disclosure.

Turning now to the drawings, FIG. 1 generally illustrates a bicycle 50 that employs a rear derailleur and a damper constructed in accordance with the teachings of the present disclosure. The bicycle 50 includes a frame 52, a front wheel 54 and a rear wheel 56 each rotatably attached to the frame 52, and a drivetrain 58. A front brake 60 is provided for braking the front wheel 54 and a rear brake 62 is provided for braking the rear wheel 56. The bicycle 50 also generally has a seat 64 near a rear end of the frame 52 and carried on an end of a seat tube 66 connected to the frame 52. The bicycle 50 also has handlebars 68 near a forward end of the frame 52. A brake lever 70 is carried on the handlebars 68 for actuating one of the front brake 60 or rear brake 62, or both. If the brake lever 70 actuates only one of the front brake 60 and the rear brake 62, a second brake lever (not shown) may also be provided to actuate the other brake. A front and/or forward riding direction or orientation of the bicycle 50 is indicated by the direction of the arrow A in FIG. 1. As such, a forward direction for the bicycle 50 is indicated by the direction of arrow A.

While the illustrated bicycle 50 depicted in FIG. 1 is a road bike having drop-style handlebars 68, the present disclosure may be applicable to bicycles of any type, including mountain bikes with full or partial suspension, as well as bicycles with mechanically controlled (e.g. cable, hydraulic, pneumatic) and non-mechanical controlled (e.g. wired, wireless) drive systems.

The drivetrain 58 has a chain C and a front sprocket assembly 72, which is coaxially mounted with a crank assembly 74 having pedals 76. The drivetrain 58 also includes a rear sprocket assembly 78 coaxially mounted with the rear wheel 56 and a rear gear change mechanism, such as a rear derailleur 80.

Figure 2:
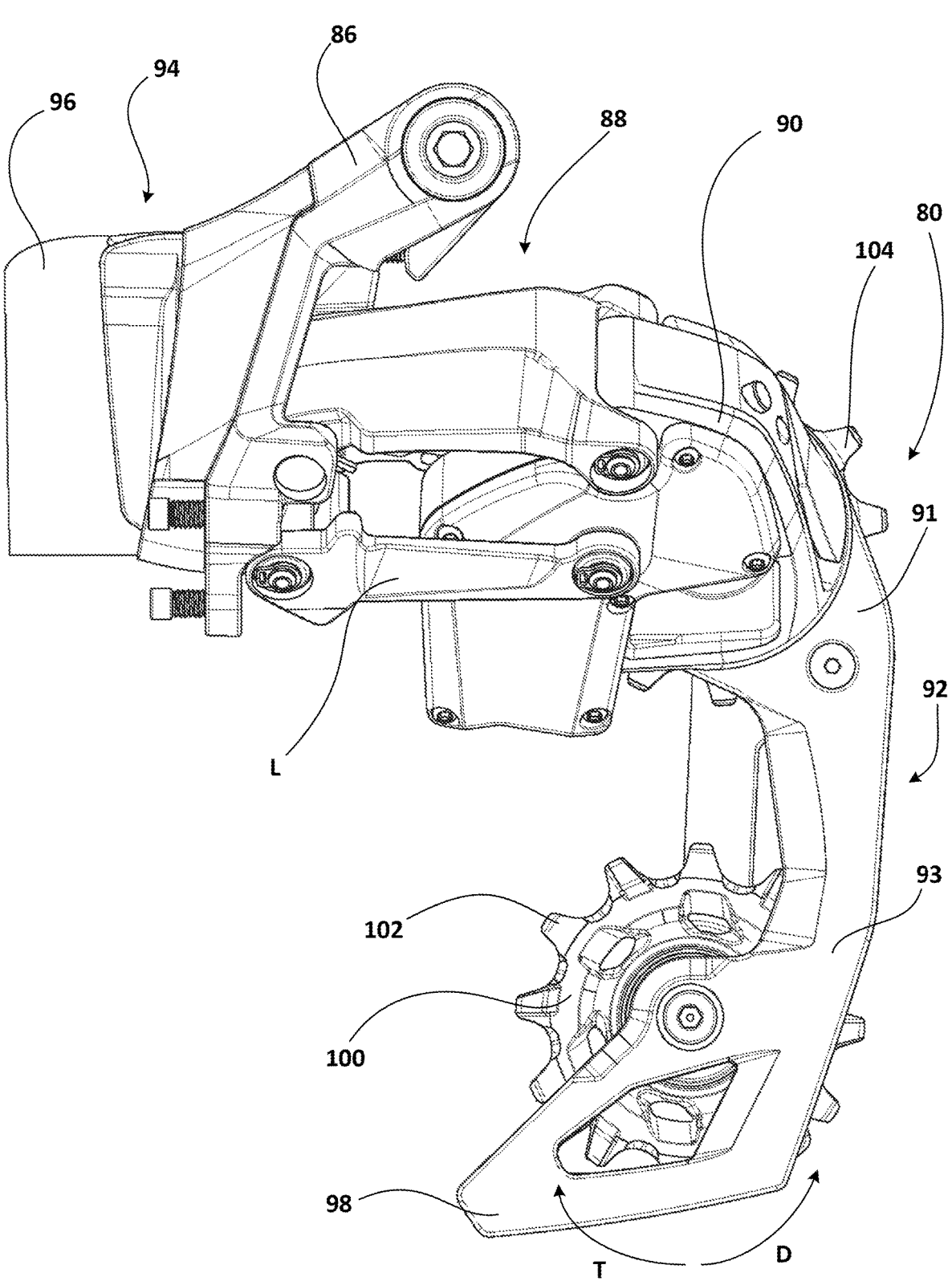
FIG. 2 is a side view of an example of an electronic rear derailleur, removed from a bicycle.

As is illustrated in FIG. 1, the front sprocket assembly 72 may include one or more coaxially mounted chain rings, gears, or sprockets F. In this example, the front sprocket assembly 72 has two such sprockets F, each having teeth 82 around a respective circumference. As shown in FIGS. 1 and 2, the rear sprocket assembly 78 may include a plurality (e.g., eleven) of coaxially mounted gears, cogs, or sprockets G. Each sprocket G also has teeth 84 arranged around a respective circumference. The number of teeth 82 on the smaller diameter front sprocket F may be less than the number of teeth on the larger diameter sprocket F. The numbers of teeth 84 on the rear sprockets G may gradually decrease from the largest diameter rear sprocket G to the smallest diameter sprocket G. Though not described in detail herein, a front gear changer 85 may be operated to move from a first operating position to a second operating position to move the chain C between the front sprockets F. Likewise, the rear derailleur 80 may be operable to move between, for example, eleven different operating positions to switch the chain C to a selected one of the rear sprockets G.

Figure 3:
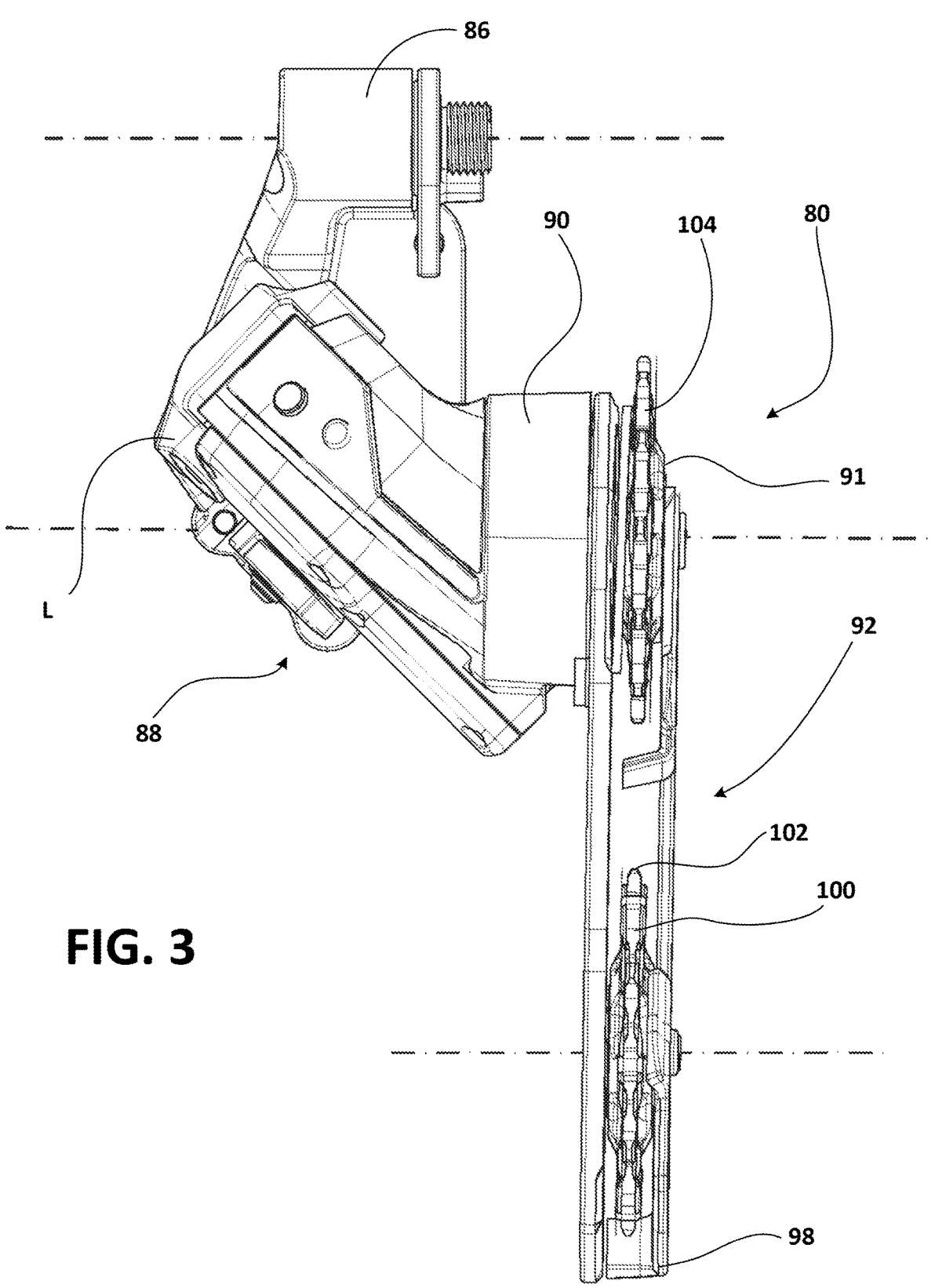
FIG. 3 is a front view of the electronic rear derailleur of FIG. 2.

Referring to FIGS. 2 and 3, the rear derailleur 80 is depicted in these examples as a wireless, electrically actuated rear derailleur mountable to the frame 52 of the bicycle 50. The electric rear derailleur 80 has a base member 86 (e.g., a b-knuckle) that is mountable to the bicycle frame 52. A linkage 88 has two links L (one is hidden behind the other in FIG. 2) that are pivotally connected to the base member 86. A movable member 90 (e.g., a p-knuckle) is connected to the linkage 88. A chain guide assembly 92 (e.g., a cage) has a cage plate 93 with a proximal end 91 that is pivotally connected to a part of the movable member 90, as described further below. Referring to FIG. 2, the cage plate 93 may rotate or pivot about a cage rotation axis R in a damping direction D and a chain tensioning direction T.

A motor module 94 is carried on the electric rear derailleur 80 and has a battery 96. The battery 96 supplies power to the motor module 94. In one example, as illustrated in FIG. 2, the motor module 94 is located in the base member 86. However, the motor module 94 may instead be located elsewhere, such as in one of the links L of the linkage 88 or in the movable member 90. The motor module 94 may include, though not shown herein, a gear mechanism or transmission. As is known in the art, the motor module 94 and gear mechanism may be coupled with the linkage 88 to laterally move the cage plate 93 and thus switch the chain C among the rear sprockets G on the rear sprocket assembly 78.

The cage plate 93 also has a distal end 98 that carries a tensioner cog or wheel 100 (e.g., a tensioner wheel). The wheel 100 also has teeth 102 around a circumference. The cage plate 93 is biased in the chain tensioning direction T to maintain tension in the chain C. The chain guide assembly 92 may also include a second cog or wheel, such as a guide wheel 104 disposed nearer the proximal end 91 of the cage plate 93 and the movable member 90. In operation, the chain C is routed around one of the rear sprockets G. An upper segment of the chain C extends forward to the front sprocket assembly 72 and is routed around one of the front sprockets F. A lower segment of the chain C returns from the front sprocket assembly 72 to the tensioner wheel 100 and is then routed forward to the guide wheel 104. The guide wheel 104 directs the chain C to the rear sprockets G. Lateral movement of the cage plate 93, tensioner wheel 100, and guide wheel 104 may determine the lateral position of the chain C for alignment with a selected one of the rear sprockets G.

Referring to FIG. 1, a control unit 106 may be mounted to the handlebars 68 for actuating the motor module 94 and operating the rear derailleur 80 for executing gear changes and gear selection. The control unit 106, however, may be located anywhere on the bicycle 50 or, alternatively, may be distributed among various components of the bicycle 50, with routing of a communication link to accommodate necessary signal and power paths. The control unit 106 may also be located other than on the bicycle 50, such as, for example, on a rider's wrist or in a jersey pocket. The communication link may include wires, may be wireless, or may be a combination thereof. In one example, the control unit 106 may be integrated with the rear derailleur 80 to communicate control commands between components. The control unit may include a processor, a memory, and one or more communication interfaces.

The battery 96 may instead be an alternate power supply or power source and may operate other electric components of the bicycle 50 within a linked system. The battery 96 or other power supply may also be located in other positions, such as attached to the frame 52. Further, multiple power supplies may be provided, which may collectively or individually power the electric components of the system, including the rear derailleur 80, such as a drive motor for an embodiment involving an electrically powered bicycle. In this example, however, the battery 96 is configured to be attached directly to the rear derailleur 80, and to provide power only to the components of the rear derailleur 80.

The movable member 90 (e.g., acting as a housing) houses a damper device (e.g., a damper). An example of a damper 120 is now described referring to FIGS. 4-6. Though discussed herein as a part of a rear derailleur of a bicycle, the damper 120 may be incorporated into a chain tensioner or chain guide assembly of a bicycle, where the chain tensioner is not a part of a front or rear derailleur.

Figure 4:
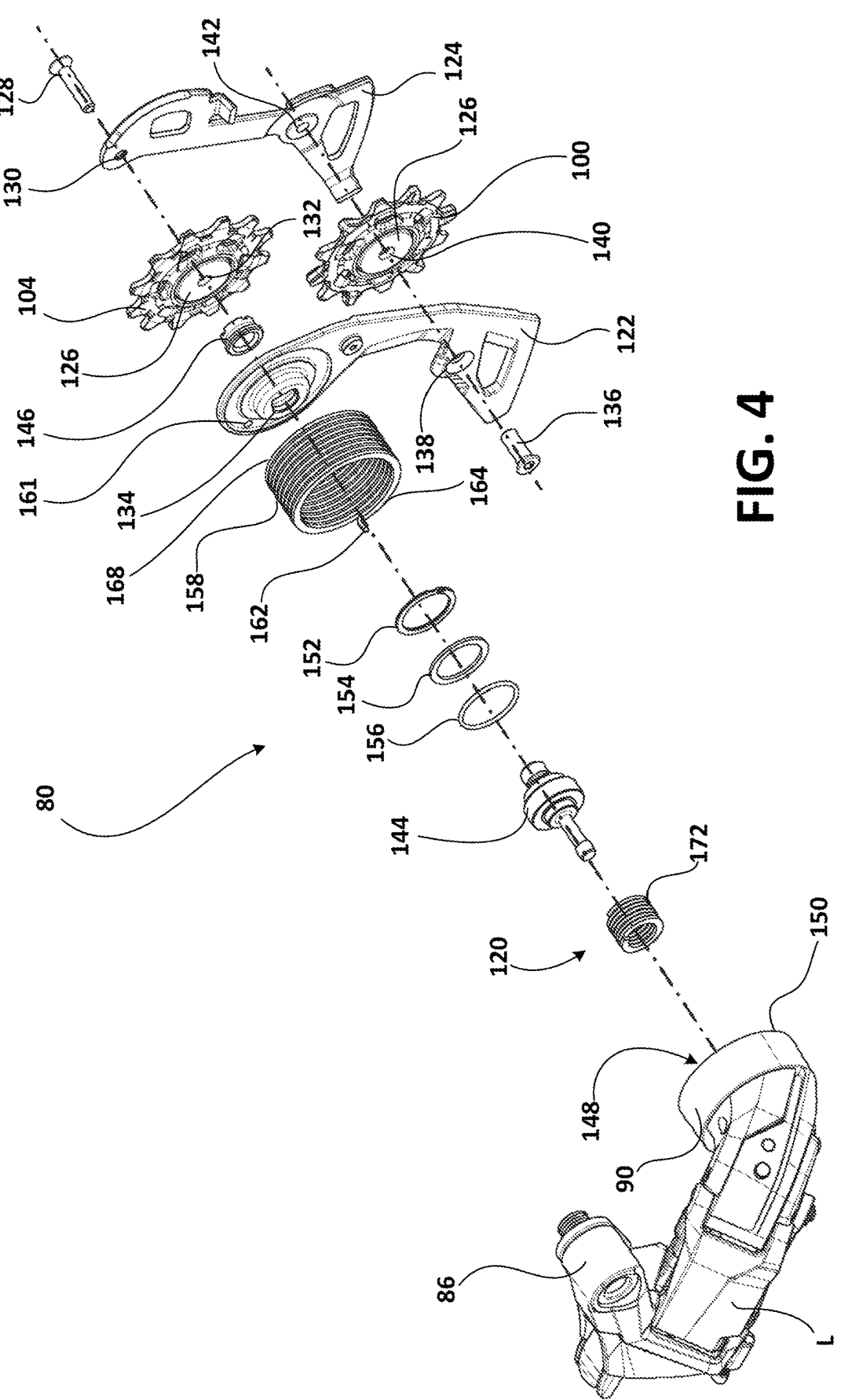
FIG. 4 is an exploded perspective view of a portion of one example of a rear derailleur, including a first damper in accordance with the teachings of the present disclosure.

Referring to FIG. 4, the chain guide assembly 92 includes an outer plate 122 and an inner plate 124, spaced apart. The outer plate 122 and the inner plate 124 are, for example, rigid plates. The tensioner wheel 100 and the guide wheel 104 are rotatably arranged between the outer plate 122 and the inner plate 124 for receiving the chain (not shown). For example, the tensioner wheel 100 and the guide wheel 104 are rotatable relative to the outer plate 122 and the inner plate 124 of the chain guide assembly 92 via corresponding bearings 126, respectively, with which the tensioner wheel 100 and the guide wheel 104 rotate.

The movable member 90 may be made of any number of different materials. For example, the movable member 90 may be made of glass-filed Nylon. The outer plate 122 and the inner plate 124 may be made of any number of materials. For example, the outer plate 122 may be made of stamped aluminum, and the inner plate 124 may be made of stamped steel. Other materials may be used. The outer plate 122 may be treated to help protect against corrosion since the outer plate 122 does not prevent ingress of moisture and/or debris from reaching the damper device 120. For example, the outer plate 122 may include an electrophoretic deposition (ED) coating.

A first connector 128 (e.g., a first screw or bushing) extends through a first opening 130 through the inner plate 124, an opening 132 through the bearing 126 of the guide wheel 104, and a first opening 134 through the outer plate 122, and connects the inner plate 124, the guide wheel 104, and the outer plate 122 to the moveable member 90 of the rear derailleur 80.

A second connector 136 (e.g., a second screw or bushing) extends through a second opening 138 through the outer plate 122, an opening 140 through the bearing 126 of the tensioner wheel 100, and a second opening 142 through the inner plate 124, and connects the tensioner wheel 100 to the outer plate 122 and the inner plate 124 (e.g., with a nut).

The outer plate 122 is connected in a rotatably fixed manner with a rotational shaft 144 (e.g., a cage shaft). For example, the outer plate 122 is connected in a rotatably fixed manner with the rotational shaft 144 via the first connector 128 and a nut 146 (e.g., a cage nut) disposed between the outer plate 122 and the guide wheel 104. The first connector 128 is, for example, screwed into an inner thread of the rotational shaft 144, and the nut 146 is tightened against the outer plate 122, such that the outer plate 122 is rotationally fixed relative to the rotational shaft 144.

The rotational shaft 144 is supported (e.g., with two bearings) for rotation in a cavity 148 (e.g., a first cavity) of the movable member 90. The first cavity 148 may form a passage (e.g., a stepped passage bore) extending from a first axial side 150 of the movable member 90 partially into the movable member 90. In other words, the first cavity 148 may not extend all the way through the movable member 90. The movable member 90 thus has a single open side (e.g., the first axial side 150). The single open side 150 is on a same side of the moveable member 90 as the chain guide assembly 92.

Intermediate members 152, 154, and 156 seal a portion (e.g., a first portion) of the first cavity 148 from the environment in which the rear derailleur 80 is being used. The intermediate members 152, 154, and 156 disposed around the rotational shaft 144, together with the movable member 90, prevent, for example, dirt and moisture from entering the first portion of the first cavity 148, in which a portion of the rotational shaft 144 (e.g., including an end of the rotational shaft 144) rotates. In other words, the first portion of the first cavity 148 is enclosed.

Figure 6:
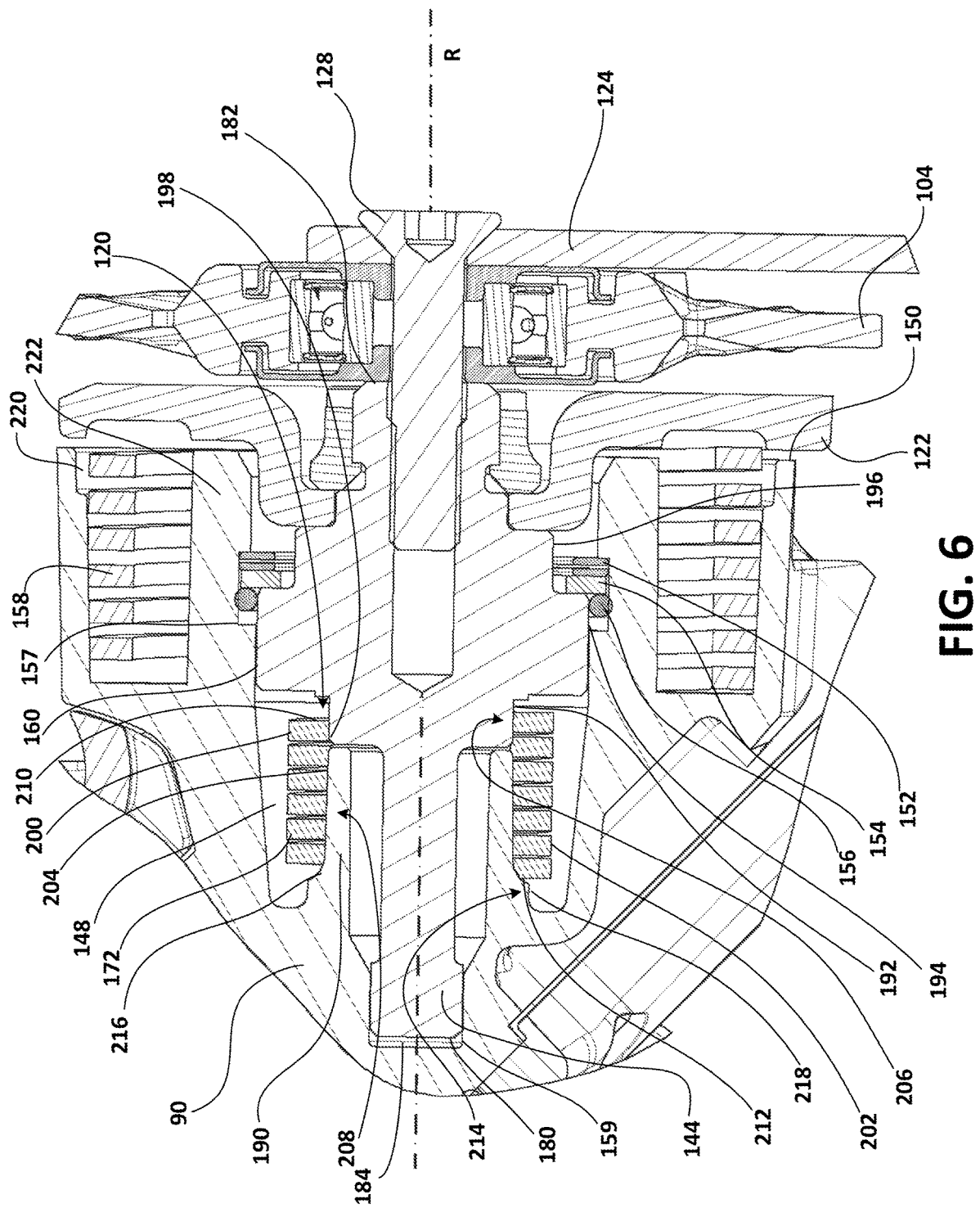
FIG. 6 is a close-up of the front cross-section view of FIG. 5.

The intermediate members 152, 154, and 156 are disposable around the rotational shaft 144 and are positionable within the first cavity 148 within the movable member 90, such that the intermediate members 152, 154, and 156 abut the rotational shaft 144 and/or the movable member 90 (see FIG. 6). The intermediate members 152, 154, 156, for example, form a dynamic seal.

The intermediate member 152 is, for example, a retaining ring. The intermediate member 154 is, for example, a washer. The intermediate member 156 is, for example, a gasket (e.g., an O-ring). In the example shown in FIG. 4, the retaining ring 152 is closest to the first axial side 150 of the movable member 90, the washer 154 is next closest to the first axial side 150 of the movable member 90, and the gasket 156 is furthest from the first axial side 150 of the movable member 90. Other ordering may be provided. The intermediate members 152, 154, and 156 may be made of any number of materials. For example, the retaining ring 152 may be made of stainless steel, the washer 154 may be made of plastic or aluminum, and the gasket 156 may be made of Silicone. Other materials may be used. More, fewer, and/or different intermediate members may be provided.

Referring to FIG. 6, the retaining ring 152 sits within a cutout 157 within the first cavity 148 of the movable member 90 (e.g., a second portion of the first cavity 148). The retaining ring 152 does not include any threads. In one embodiment, however, the retaining ring 152 includes threads that are engageable with corresponding threads in the movable member 90.

Due to a small size of the retaining ring 152, a distance between bearing surfaces 159 and 160 between the rotational shaft 144 and the movable member 90 may be maximized. For example, the damper 120 may be bookended by the bearing surfaces 159 and 160. This is advantageous in that the maximized distance between the bearing surfaces 159 and 160 reduces the amount of rocking movement between the rotational shaft 144 and the movable member 90.

Referring to FIG. 4, a biasing device 158 engages with the movable member 90 and a coupling portion 161 of the outer plate 122 in a positive-locking manner. For example, the biasing device 158 includes a first tab 162 at one end 164 of the biasing device 158 and a second tab (not shown) at the other end 168 of the biasing device 158. The first tab 162 is disposable within a corresponding recess within the movable member 90, and the second tab is disposable within the coupling portion 161 (e.g., an opening) of the outer plate 122. The biasing device 158 may be attached to the movable member 90 and the outer plate 122 in other ways.

The biasing device 158, for example, biases the chain guide assembly 92 in the chain tensioning direction T to maintain or restore the necessary tensioning of the chain C, which is engaged with the tensioner wheel 100 and the guide wheel 104. The biasing device 158 may be any number of different types of biasing devices including, for example, a torsion spring. The biasing device 158 may be made of any number of materials including, for example, steel. The biasing device 158 may be treated for corrosion protection. For example, the biasing device 158 may include an ED coating.

In accordance with the teachings of the present disclosure, the damper 120 is disposable within the movable member 90, about the rotational shaft 144. The damper 120 is operable to apply a damping force (e.g., a radial force) to the rotational shaft 144, and thus the chain guide assembly 92, when the chain guide assembly 92, and thus the rotational shaft 144, rotates in the damping direction D.

The damper 120 includes a friction member 172 (e.g., an annular friction member). In one example, the friction member 172 is a spring (e.g., a torsion wrap spring) having a plurality of coils. The torsion wrap spring 172, for example, acts as a clutch spring. The torsion wrap spring 172, for example, may be left hand wound (e.g., counter clockwise when looking at the movable member 90 from the chain guide assembly 92). This may be beneficial since the spring 172 and the rotational shaft 144 are pressed into the movable member from the first axial side 150 of the movable member 90 (e.g., the same side as the chain guide assembly 92). The movable member 90 being accessible from the single open side 150 may change an orientation of the damper device 120 relative to the movable member 90 compared to other damper devices.

The spring 172 may have four to six or more coils. Other numbers of coils may be provided. The friction member 172 is radially outer relative to the rotational shaft 144 and radially inner relative to the biasing device 158.

Figure 5:
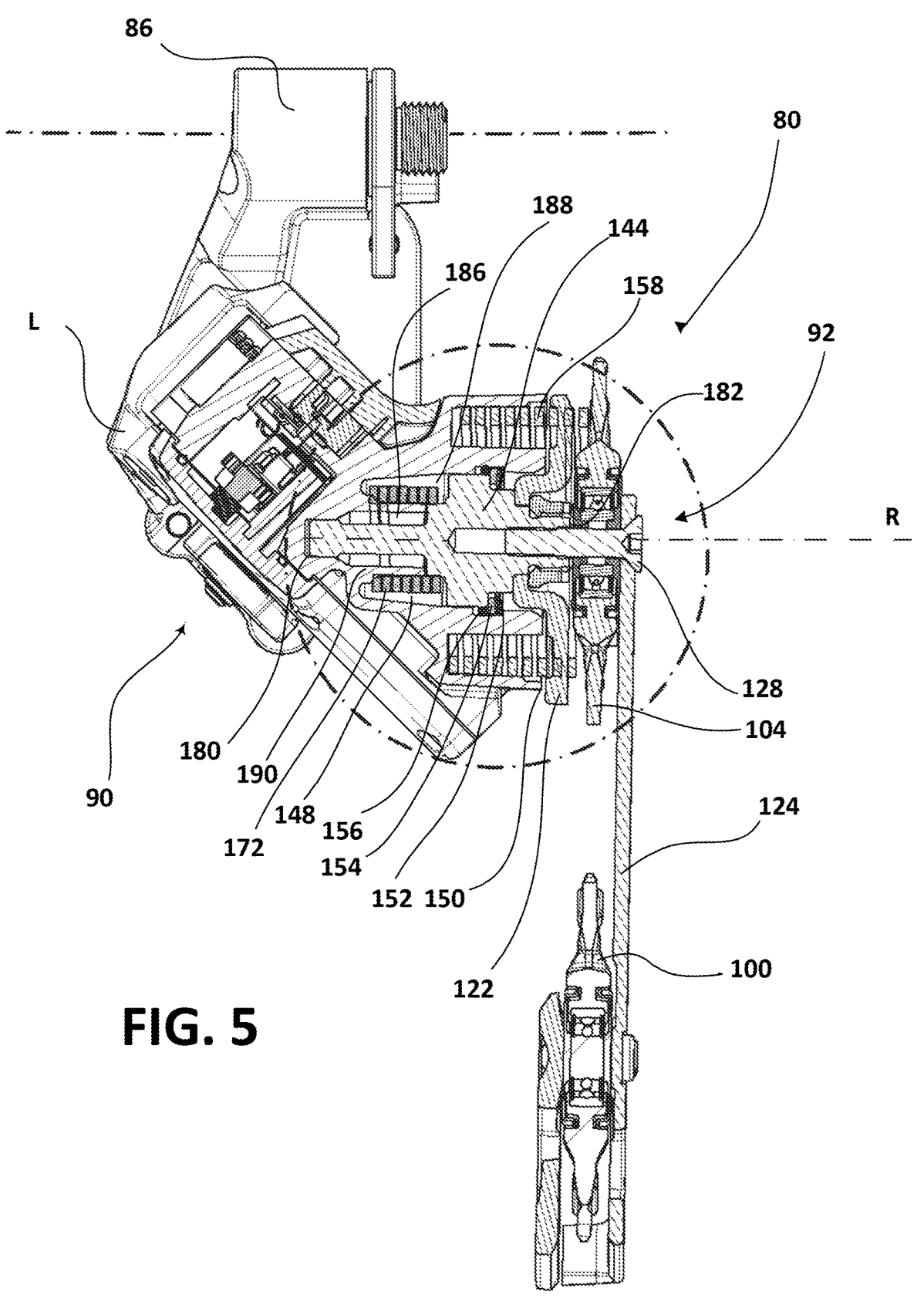
FIG. 5 is a front cross-section view of an example of an electronic rear derailleur including a damper in accordance with the teachings of the present disclosure.

As shown in FIGS. 5 and 6, once the rear derailleur 90 is assembled, the friction member 172 is biased against and in frictional engagement with the rotational shaft 144 (e.g., a pivot member). The rotational shaft 144 includes a first end 180 and a second end 182 opposite the first end 180. The first end 180 of the rotational shaft 144 is supported by the movable member 90 within a portion 184 of the first cavity 148 (e.g., the portion of the first cavity 148 sealed by the intermediate members 152, 154, and 156). The second end 182 of the rotational shaft 144 extends beyond the first axial side 150 of the movable member 90 and out of the movable member 90. In one embodiment, the rotational shaft 144 does not extend beyond the first axial side 150 of the movable member 90 but is disposed within the movable member 90.

The first cavity 148 includes a first part 186 and a second part 188 separated by a wall 190 (e.g., a first annular wall). The first annular wall 190 partially forms the first cavity 148. The first end 180 of the rotational shaft 144 is disposed within the first part 186 of the first cavity 148, and the friction member 172 is disposed within the second part 188 of the first cavity 148.

Referring to FIG. 6, the rotational shaft 144 has an outer annular surface 192 (e.g., a first outer annular surface) with which the friction member 172 engages. In the example shown in FIGS. 5 and 6, the rotational shaft 144 includes a plurality of outer annular surfaces (e.g., nine outer annular surfaces) with different diameters. For example, the rotational shaft 144 has a second outer annular surface 194 with which the gasket 156 engages, and a third outer annular surface 196 with which the retaining ring 152 engages. Other parts (e.g., other intermediate members) may engage with the first outer annular surface 192, the second outer annular surface 194, the third outer annular surface 196, and/or other outer annular surfaces of the rotational shaft 144.

The friction member 172 has a friction surface 198. For example, the friction surface 198 is an inner surface (e.g., an inner annular surface) of the torsion wrap spring 172 (e.g., an inner surface of the plurality of coils). A first part 200 of the friction member 172 (e.g., a first part of the friction surface 198) is biased against and in frictional engagement with the first outer annular surface 192 of the rotational shaft 144, and a second part 202 of the friction member 172 (e.g., a second part of the friction surface 198) is biased against and in frictional engagement with the movable member 90. For example, the second part 202 of the friction member 172 is biased against and in frictional engagement with the first annular wall 190 within the first cavity 148 of the movable member 90.

Referring to FIG. 6, the first annular wall 190 has an outer annular surface 204, and the outer annular surface 204 of the first annular wall 190 is in line (e.g., flush) with the first outer annular surface 192 of the rotational shaft 144 when the rotational shaft 144 is installed within the movable member 90. In other embodiments, the first outer annular surface 192 of the rotational shaft 144 may be offset relative to the outer annular surface 204 of the first annular wall 190 in a radially outer direction or a radially inner direction.

The second part 202 of the friction member 172, for example, creates a larger frictional force than the first part 200 of the friction member 172. For example, a length of the second part 202 of the friction member 172 is greater than a length of the first part 200 of the friction member 172. The plurality of coils of the friction member 172 include a first portion of coils 206 (e.g., corresponding to the first part 200 of the friction member 172; one or more first coils) and a second portion of coils 208 (e.g., corresponding to the second part 202 of the friction member 172; one or more second coils). The one or more first coils 206 are, for example, active coils that engage with the rotational shaft 144, and the one or more second coils 208 are, for example, non-active coils (e.g., passive coils) that engage with the movable member 90 (e.g., the first annular wall 190 of the movable member 90).

The second portion of coils 208 may include more coils (e.g., coil windings) than the first portion of the coils 206. A friction force on the static side (e.g., a clutch side; at the movable member 90) is greater than a friction force on the dynamic side (e.g., a damper side; at the rotational shaft 144). In the example shown in FIGS. 5 and 6, the first portion of coils 206 includes between one and two coil windings (e.g., 1.5 coil windings), and the second portion of coils 208 includes between five and six coil windings (e.g., 5.5 coil windings). Other configurations may be provided. For example, the first portion of coils 206 may include two coil windings, and the second portion of coils 208 may include four coil windings. As another example, the first portion of the coils 206 may include one winding, and the second portion of the coils 208 may include five windings. The greater the number of active coils 206, for example, on the rotational shaft 144, the greater the torque (e.g., per half millimeter of coil, a force increases 0.4-0.6 Newton-meters).

The friction member 172 has a first end 210 and a second end 212 opposite the first end 210. The first portion of coils 206 are disposed at and/or adjacent to the first end 210 of the friction member 172, and the second portion of coils 208 are disposed at and/or adjacent to the second end 212 of the friction member 172.

In the example shown in FIGS. 5 and 6, the first annular wall 190 has a base portion 214. The base portion 214 has, for example, an angled section 216 (e.g., a curved section) and a straight section 218. The curved section 216 of the base portion 214 is angled relative to the cage rotation axis R. The curved section 216 of the base portion 214 curves away from the outer annular surface 204 of the first annular wall 190 to the straight section 218 of the base portion 214, such that the straight section 218 of the base portion 214 of the first annular wall 190 is radially outer relative to the outer annular surface 204 of the first annular wall 190. The second end 212 of the friction member 172 engages with (e.g., is embedded within) the curved section 216 of the base portion 214 of the first annular wall 190, such that the friction member 172 is biased towards the chain guide assembly 92. In other words, the engagement of the second end 212 of the friction member 172 with the curved section 216 of the base portion 214 of the first annular wall 190 axially locates the friction member 172 relative to the movable member 90 and the rotational shaft 144. The axial locating allows for variance in spring length during manufacturing.

This biasing towards the chain guide assembly 92 prevents the friction member 172 from moving deeper into the second part 188 of the first cavity 148, such that less of the friction member 172 or none of the friction member 172 engages with the rotational shaft 144. Such movement of the friction member 172 into the second part 188 of the first cavity 148 would provide that the damper 120 works worse or not at all.

Referring to FIG. 6, the friction member 172 is disposed within the first cavity 148, and the biasing device 158 is disposed within a second cavity 220 within the movable member 90, such that friction member 172 is at a distance relative to the biasing device 158 in a direction along the cage rotation axis R (e.g., an axial direction). In other words, the friction member 172 and the biasing device 158 may not overlap in the axial direction.

The second cavity 220 extends from the first axial side 150 of the movable member 90, partially into the movable member 90. The second cavity 220 is separated from the first cavity 148 by a second annular wall 220. The second cavity 220 does not extend as far into the movable member 90 as the first cavity 148 extends into the movable member 90.

The biasing device 158 is closer to the chain guide assembly 92 (i.e., outboard) than the friction member 172 is relative to the chain guide assembly 92. In other words, a distance between the friction member 172 and the chain guide assembly 92 is greater than a distance between the biasing device 158 and the chain guide assembly 92. The friction member 172 is disposed within the first cavity 148, such that the friction member 172 is closer to the first end 180 of the rotational shaft 144 than the second end 182 of the rotational shaft 144.

The friction member 172 may act as a spring clutch. The frictional engagement between the inner annular surface 198 of the friction member 172 and the first outer annular surface 192 of the rotational shaft 144 restricts rotational motion of the chain guide assembly 92 relative to the movable member 90. When the chain guide assembly 92 and the rotational shaft 144 rotate in the damping direction D, with the first end 210 of the friction member 172 more free to move than the second end 212 of the friction member 172 due to different coefficients of friction of the first annular surface 192 of the rotational shaft 144 and the outer annular surface 204 of the first annular wall 190, respectively, the frictional engagement between the friction member 172 and the first annular surface 192 of the rotational shaft 144 causes an inner diameter of the friction member 172 to get smaller and the length of the friction member 172 to get longer. When the chain guide assembly 92 and the rotational shaft 144 rotate in the damping direction D, the frictional engagement between the friction member 172 and the first outer annular surface 192 of the rotational shaft 144 causes the friction member 172 to tighten on the rotational shaft 144, thus increasing the radial force on the rotational shaft 144.

The friction member 172 thus creates a higher torque on the rotational shaft 144 when the chain guide assembly 92 and the rotational shaft 144 rotate in the damping direction D compared to when the chain guide assembly 92 and the rotational shaft 144 rotate in the tensioning direction T. Different ratios of torques created by the friction member 172 on the rotational shaft 144 when the chain guide assembly 92 and the rotational shaft 144 rotate in the damping direction D compared to when the chain guide assembly 92 and the rotational shaft 144 rotate in the tensioning direction T, respectively, may be provided based on different sizes, shapes, and/or materials of the friction member 172, the movable member 90, and/or the rotational shaft 144, and/or different positioning of the friction member 144 along the rotational shaft 144 and the first annular wall 190 of the movable member 90.

Although certain bicycle derailleurs, bicycles, and methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A bicycle rear derailleur comprising:
a base member mountable to a bicycle frame;
a movable member being formed as a single unitary piece and movably coupled to the base member;
a pivot member rotatably coupled to the movable member, the pivot member having a first outer annular surface and a second outer annular surface;
a chain guide assembly rotatably connected to the movable member via the pivot member, the chain guide assembly being non-rotatably coupled to the pivot member;
a first bearing surface where the first outer annular surface of the pivot member rotationally engages the moveable member;
a second bearing surface where the second outer annular surface of the pivot member rotationally engages the movable member;
a biasing device configured to bias the chain guide assembly in a first rotational direction relative to the movable member; and
a damper device disposed within the movable member, the damper device operable to apply a damping force to the chain guide assembly when the chain guide assembly rotates in a second rotational direction relative to the movable member, the second rotational direction being opposite the first rotational direction, the damper device including:
a friction device including a friction member,
wherein the friction member is located between the first bearing surface and the second bearing surface in an axial direction along the pivot member.

2. The bicycle rear derailleur of claim 1, wherein the second bearing surface has a smaller diameter than the first bearing surface.

3. The bicycle rear derailleur of claim 2, wherein the pivot member includes a third outer annular surface, and the friction member has an inner friction surface and an outer surface, wherein the inner friction surface is biased against and in frictional engagement with the third outer annular surface of the pivot member.

4. The bicycle rear derailleur of claim 3, wherein the third outer annular surface of the pivot member has a larger diameter than the second outer annular surface of the pivot member, and
the third outer annular surface of the pivot member has a smaller diameter than the first outer annular surface of the pivot member.

5. The bicycle rear derailleur of claim 3, wherein the inner friction surface has a first portion and a second portion, wherein the first portion of the inner friction surface is biased against and in frictional engagement with the third outer annular surface of the pivot member, and the second portion of the inner friction surface is biased against and in frictional engagement with the movable member.

6. The bicycle rear derailleur of claim 5, wherein the second portion of the inner friction surface is in frictional engagement with a surface of one or more inner surfaces of the movable member at, adjacent to, or at and adjacent to a second end of the friction member, such that a first end of the friction member is biased towards the chain guide assembly.

7. The bicycle rear derailleur of claim 6, wherein the surface of the movable member is angled relative to an axis of rotation of the pivot member such that the friction member is biased towards the chain guide assembly.

8. The bicycle rear derailleur of claim 1, wherein the friction device is disposed within the movable member at a distance relative to the biasing device in the axial direction along the pivot member, such that the friction device and the biasing device do not overlap in the axial direction.

9. The bicycle rear derailleur of claim 1, wherein a distance between the friction device and the chain guide assembly in the axial direction is greater than a distance between the biasing device and the chain guide assembly in the axial direction.

10. The bicycle rear derailleur of claim 1, wherein the friction device is radially inner relative to the biasing device.

11. The bicycle rear derailleur of claim 1, wherein the friction member is a torsion spring.

12. The bicycle rear derailleur of claim 11, wherein the torsion spring is left hand wound.

13. The bicycle rear derailleur of claim 1, wherein the movable member has a single open side, wherein the movable member includes a cavity that extends from the single open side of the movable member into the movable member, wherein the friction device and at least part of the pivot member are disposed in the cavity.

14. The bicycle rear derailleur of claim 13, wherein the single open side of the movable member is on a same side of the movable member as the chain guide assembly.

15. A bicycle rear derailleur comprising:

a base member mountable to a bicycle frame;

a movable member movably coupled to the base member, the movable member being a blind hole and open on a single side, the movable member having a recess extending from the single open side, partially through the movable member;

a pivot member rotatably coupled to the movable member, the pivot member having a first outer annular surface and a second outer annular surface;

a chain guide assembly rotatably connected to the movable member via the pivot member, the chain guide assembly being non-rotatably coupled to the pivot member;

a first bearing surface where the first outer annular surface of the pivot member rotationally engages the moveable member;

a second bearing surface where the second outer annular surface of the pivot member rotationally engages the movable member;

a biasing device configured to bias the chain guide assembly in a first rotational direction relative to the movable member;

a damper device disposed within the recess of the movable member, the damper device operable to apply a damping force to the chain guide assembly when the chain guide assembly rotates in a second rotational direction relative to the movable member, the second rotational direction being opposite the first rotational direction, the damper device including:

a friction device in frictional engagement with the pivot member and the movable member, and wherein the friction device is located between the first bearing surface and the second bearing surface in an axial direction along the pivot member.

* * * * *